UNITED STATES PATENT OFFICE.

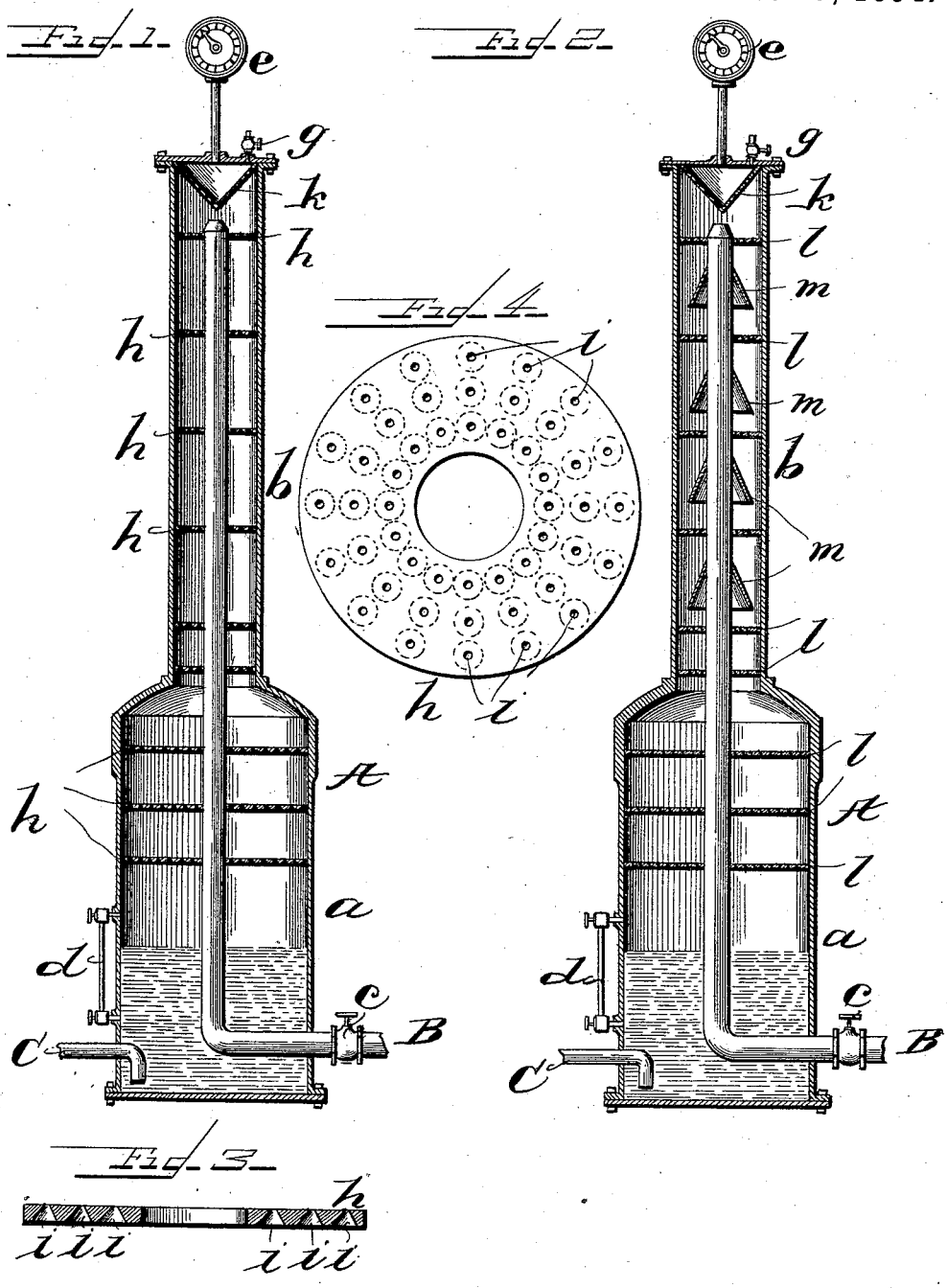

HARVEY S. FERRY, OF MOUNT VERNON, ASSIGNOR TO THE FERRY MANUFACTURING COMPANY, OF NEW YORK, N. Y.

METHOD OF AND MEANS FOR CARBONATING LIQUIDS.

SPECIFICATION forming part of Letters Patent No. 530,070, dated November 27, 1894.

Application filed October 25, 1893. Serial No. 489,129. (No model.)

*To all whom it may concern:*

Be it known that I, HARVEY S. FERRY, a citizen of the United States, residing at Mount Vernon, in the county of Westchester and State of New York, have invented certain new and useful Improvements in Methods of and Means for Carbonating Liquids; and I do hereby declare the following to be a full, clear, and exact description of the invention, such as will enable others skilled in the art to which it appertains to make and use the same.

My present invention relates to the art of preparing carbonated beverages and has for its object a thorough commingling of the carbonic acid gas and the liquid so that the liquid shall be charged to its full capacity with the gas.

The invention will be fully disclosed in the following specification and claims.

In the accompanying drawings, which form part of this specification, Figure 1 represents a vertical section of one form; Fig. 2, a like view of a modification; Fig. 3, a transverse section of one of the diaphragms of Fig. 1 on an enlarged scale, and Fig. 4 a top plan view of the same.

Reference being had to the drawings and the letters thereon A indicates a vessel for containing carbonated liquids and consists of a lower portion $a$ and an upper and contracted portion $b$.

B indicates a supply pipe which communicates with a suitable source of supply, such as a pump (not shown) and through which the liquid is conducted into the vessel A, and is provided with a controlling valve $c$.

C indicates a discharge pipe through which carbonated liquid is conducted from the vessel. The vessel is provided with a sight gage $d$ to indicate the height of liquid and with a pressure gage $e$ on the upper end to indicate the pressure of the gas in the vessel, and on the upper head $f$ of the vessel is a petcock $g$ to discharge air which separates from the liquid and accumulates in the upper portion of the part $b$ of the vessel.

The vessel A is provided with means for breaking the body or column of liquid into small particles, as in drops or globules and then spreading the liquid into thin sheets or films so that the greatest possible quantity of the liquid shall be exposed to the carbonic acid gas and become thoroughly impregnated or charged with the gas; to effect which result, the vessel as shown in Fig. 1 is provided with a series of horizontal diaphragms $h$ extending from the upper end of the vessel down into the enlarged portion $a$, the lower diaphragm being but a short distance above the sight gage $d$. The diaphragms are provided with a series of passages $i$ in the form of truncated cones into which the liquid enters in small particles or bodies as drops and globules at the truncated end of the conical passages, and then spreads into thin sheets or films as it follows the wall of the passages and is exposed to the gas under pressure in the vessel A and becomes charged with the gas to its full capacity. After the liquid has passed through one diaphragm it trickles or falls in numerous drops or in fine streams upon the next diaphragm below where it is again separated in like manner and further exposed to the gas in the vessel.

In the operation of the device gas becomes separated from the liquid and fills the vessel above the surface of the liquid with gas under pressure. As the gas is absorbed by the liquid in its descent through the gas the body of gas rises in the vessel so that the gas is constantly changing and more or less of a current of the gas is maintained in the vessel.

The diaphragm may be secured in the vessel in any approved form. I have shown the supply pipe passing through the center of the diaphragms and extending up to near the upper end of the vessel, where the liquid is discharged against an inverted perforated cone $k$ and spread into a sheet.

It is obvious that the liquid may be admitted to the vessel A through the upper end or through the wall of the vessel and made to impinge against some spreading device.

In Fig. 2 the vessel A, is shown provided with a series of foraminous diaphragms $l$ provided with passages of uniform area, and under each diaphragm $l$ is a separate truncated cone $m$ in the contracted portion $b$ of the vessel, by which the liquid is acted upon in the same manner as by the construction shown in Fig. 1. These constructions are given as examples of practical means for producing the effect of charging the liquid with gas, and numerous other constructions for the purpose will be readily suggested to the skilled mechanic.

The liquid may be supplied with or without being previously charged with carbonic acid gas, but I prefer to first charge the liquid with gas and recharge it with the gas as the liquid passes down from the upper end of the vessel through the gas under pressure until it reaches the lower part $a$ from which it is discharged.

Having thus fully described my invention, what I claim is—

1. The method of carbonating liquids, which consists in charging a body or column of liquid with carbonic acid gas, conducting the liquid into a vessel and separating the liquid into thin sheets or films and recarbonating the liquid by causing it to fall through a volume of gas derived from the original carbonization.

2. The combination of a vessel, a series of separated and truncated spreading devices, a liquid receptacle below said devices from which liberated gas rises and through which gas the liquid passes in its descent, and supply and discharge pipes.

3. The combination of a vessel, a supply pipe entering the vessel at its lower end, a series of spreading devices surrounding the supply pipe, a liquid receptacle below said devices and a discharge pipe.

4. The combination of a vessel provided with suitable supply and discharge pipes, and diaphragms having truncated conical passages, the supply pipe discharging at the upper end of the vessel and the discharge pipe communicating with the lower end of the vessel.

In testimony whereof I affix my signature in presence of two witnesses.

HARVEY S. FERRY.

Witnesses:
WM. A. MIDDLETON,
WM. B. KLINE.